United States Patent
Bianchi

[19]

[11] Patent Number: 6,010,073
[45] Date of Patent: Jan. 4, 2000

[54] PORTABLE APPARATUS FOR READING AN OPTICAL CODE

[75] Inventor: Maurizio Bianchi, Bologna, Italy

[73] Assignee: DATALOGIC S.p.A., Lippo di Calderara di Reno, Italy

[21] Appl. No.: 08/903,724

[22] Filed: Jul. 31, 1997

[30] Foreign Application Priority Data

Aug. 1, 1996 [EP] European Pat. Off. .............. 96830439

[51] Int. Cl.⁷ ....................................................... G06K 7/10
[52] U.S. Cl. ................................ 235/472.01; 235/462.43; 235/462.45
[58] Field of Search .................................. 235/454, 462, 235/470, 472, 462.43, 462.45, 472.01

[56] References Cited

U.S. PATENT DOCUMENTS

| | | | |
|---|---|---|---|
| 4,074,114 | 2/1978 | Dobras . | |
| 5,270,525 | 12/1993 | Ukai et al. ................................ | 235/472 |
| 5,280,159 | 1/1994 | Schultz et al. ........................... | 235/472 |
| 5,281,801 | 1/1994 | Shepard et al. .......................... | 235/472 |
| 5,285,056 | 2/1994 | Tedesco et al. .......................... | 235/472 |
| 5,340,973 | 8/1994 | Knowles et al. ......................... | 235/472 |
| 5,349,172 | 9/1994 | Roustaei ................................... | 235/472 |
| 5,430,285 | 7/1995 | Karpen et al. . | |
| 5,673,136 | 9/1997 | Inoue et al. .............................. | 359/205 |
| 5,714,745 | 2/1998 | Ju et al. ................................... | 235/472 |

FOREIGN PATENT DOCUMENTS

| | | |
|---|---|---|
| 0488202 | 6/1992 | European Pat. Off. . |
| 0627705A2 | 7/1994 | European Pat. Off. . |
| 0610504 | 8/1994 | European Pat. Off. . |
| 0627705 | 12/1994 | European Pat. Off. . |

*Primary Examiner*—Donald Hajec
*Assistant Examiner*—Douglas X. Rodriguez
*Attorney, Agent, or Firm*—Sughrue, Mion, Zinn, Macpeak & Seas, PLLC

[57] ABSTRACT

The apparatus includes an outer case (11), a reading window (14) open into the case (ii), an illumination device (16–20) housed within the case (11) and arranged to act on the optical code being read through the window (14), and a detection device (24–28) housed within the case (11) and responsive to light scattered back from the illuminated optical code into the case (11) through the window (14). The detection device includes a light-sensitive element (24) capable of converting light to electric signals representing the light image, and an optical detection path (25–26) from the reading window (14) to the light-sensitive elements (24) having a reflective element (27) therein which effectively splits the optical path into two consecutive path sections (25,26) at an angle from each other, wherein the second path section (26) is deflected from the first path section (25). The illumination device (16–20) is located on the opposite side of the light-sensitive element (24) from the first section (25) of the optical detection path, thereby minimizing the risk of some of the light emitted by the illumination device (16–20) being transmitted directly to the light-sensitive element (24) and creating reading problems.

11 Claims, 2 Drawing Sheets

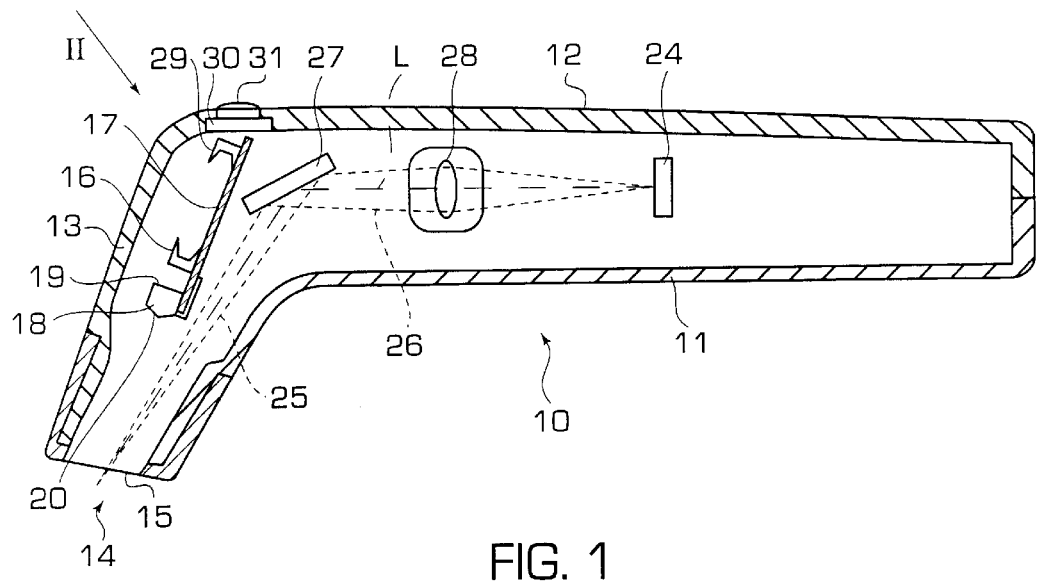
FIG. 1
FIG. 2
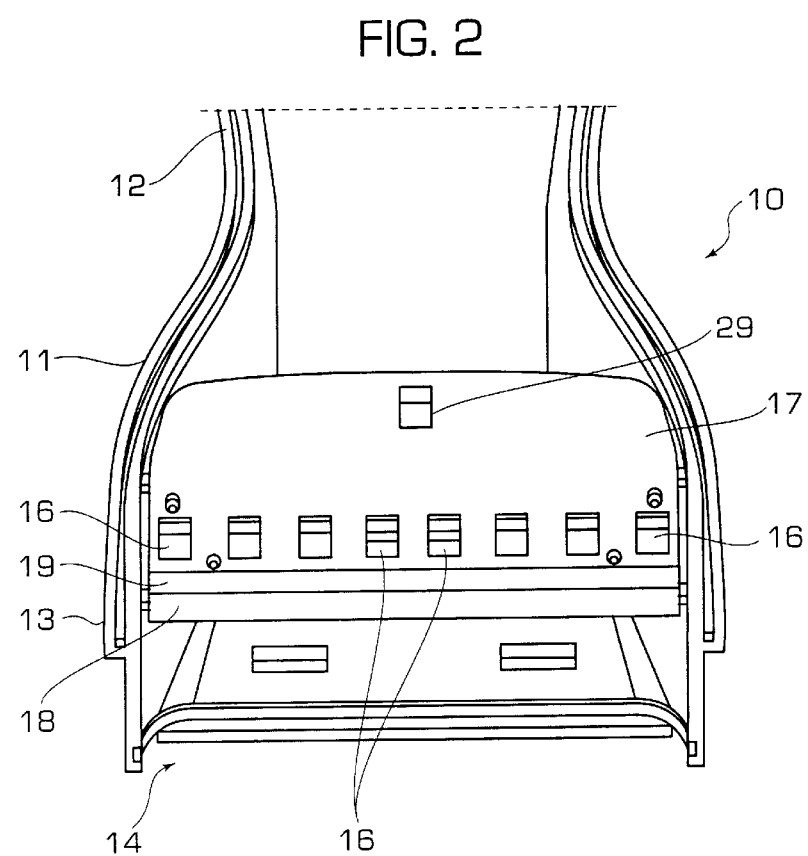

PORTABLE APPARATUS FOR READING AN OPTICAL CODE

BACKGROUND OF THE INVENTION

This invention relates to a portable apparatus for reading an optical code. The term "optical code" is used here to designate an aggregate of graphic markings (either applied on a label or directly on a product) which are used to encode information in the form of sequentially arranged black zones and white zones, or variously colored zones, lying along the same or different directions. Examples of such codes are the bar codes, two-dimensional codes, color codes, etc.

Optical codes can be read using stationary or portable reading apparatus. Portable readers have an outer case formed with a reading window through which both a means of illuminating a code to be read, and a means of reading a light image of the illuminated code by detection of the light scattered therefrom and conversion of same to electrical signals, are active. The light-sensitive elements which effect the conversion of the light signal to an electric signal can be of various types; in general, a so-called CCD (Charge Coupled Device) is used which includes a matrix comprised of a very large number of individual light-sensitive elements.

A major problem to be solved in portable optical code readers is to avoid that the light issuing from the illumination means may become mixed up with the light scattered back from the code, and thus reach the light-sensitive element to make a correct reading of the code impossible to obtain.

A document U.S. Pat. No. 5,484,994 teaches that the light issuing from the illumination means can be confined within obscure chambers open to the reading window, these obscure chambers being fully isolated from another obscure chamber which encloses the optical detection path travelled by the light image from the illuminated code.

Widely in use are portable readers of angled design, wherein the light image from the illuminated code is to travel an angled path before eventually striking the light-sensitive element. This deflection, being an obtuse angle in the 110° to 160°0 range, is provided by a plane mirror or some other suitable reflective element.

In this case, the problem of avoiding that the light from the illumination means may get mixed up with the light image from the code, actually becomes one of preventing the illuminating light from reaching the mirror directly.

SUMMARY OF THE INVENTION

Accordingly, this invention concerns a portable apparatus for reading an optical code, which apparatus comprises an outer case, a reading window open into the case, an illumination means housed within the case and arranged to act on the optical code being read through the window, and a detection means housed within the case and responsive to light scattered back from the illuminated optical code into the case through the window, wherein the detection means comprises a light-sensitive element capable of converting light to electric signals representing the light image, and an optical detection path from the reading window to the light-sensitive elements having a reflective element therein which effectively splits the optical path into two consecutive path sections at an angle from each other, wherein the second path section is deflected from the first path section, characterized in that the illumination means is located on the opposite side of the light-sensitive element from the first section of the optical detection path.

By having the illumination means located on the opposite side of the light-sensitive element from the first section of the optical detection path, i.e. outside the deflection angle of the optical detection path, the likelihood of part of illumination light reaching the reflective element directly and mixing up with the light scattered back from the illuminated optical code is reduced geometrically, even though both lights are directed through the same chamber.

Preferably, the illumination means comprises an array of LEDs which are supported on a support board, in turn mounted inside the case, which support board carries a printed power supply/control circuit for the LEDs. This design facilitates the manufacture of the apparatus in that it minimizes the number of electrical connections to be made during the apparatus assembly process.

Preferably, the LEDs are mounted on the board side facing away from the reflective element in the optical detection path. Preferably, the board would be opaque to light, for instance because made of glass-reinforced plastics and coated with a light-opaque substance. Such provisions are effective to further reduce the risk of light emitted by the LEDs reaching the reflective element directly.

Preferably, the LEDs are of the 90-degree angle type, and emit light along a substantially parallel direction to the plane containing their support board. This LED type makes the assembly easier to carry out, and directly provides for the emission of light along the desired direction (parallel to the plane of the support board), with no need for special mechanical arrangements.

Preferably, the illumination means includes a focusing lens mounted on the same side of the support board as the LEDs, in front of the LEDs. The focusing lens is preferably snap mounted to the support board, the snap action being assisted by arms formed integrally with the lens and by a tang interlocking with a respective slot formed in the support board. These provisions further contribute toward rationalizing and simplifying the apparatus manufacturing process.

Preferably, the focusing lens is mounted in an end region of the support board, facing the reading window, and may only protrude from the board by a convex portion of the lens at most. In this way, the focusing lens is fully screened by the support board itself, thereby inhibiting stray light rays from the lens-radiated light which might impinge on the reflective element.

Apparatus of this kind are often provided with an LED arranged to indicate to the user that the reading has been carried out correctly. In this case, an LED indicator would be mounted, of preference, on the side of the support board away from the reflective element in the optical detection path, so as to be aimed at an indicator window through the case. In this way, the constructional advantage is secured of having the LED indicator mounted on the same support board as the illumination LEDs, without introducing any risk of unwanted light reaching the reflective element.

Further features and advantages of an apparatus according to this invention will become apparent from the following description of a preferred embodiment thereof, made with reference to the accompanying drawings.

In the drawings:

FIG. 1 is a longitudinal section view of an apparatus according to the invention;

FIG. 2 is a view of the apparatus in FIG. 1 with part of its outer case removed, as taken in the direction of arrow II in FIG. 1;

DETAILED DESCRIPTION OF THE INVENTION

Figure 3:
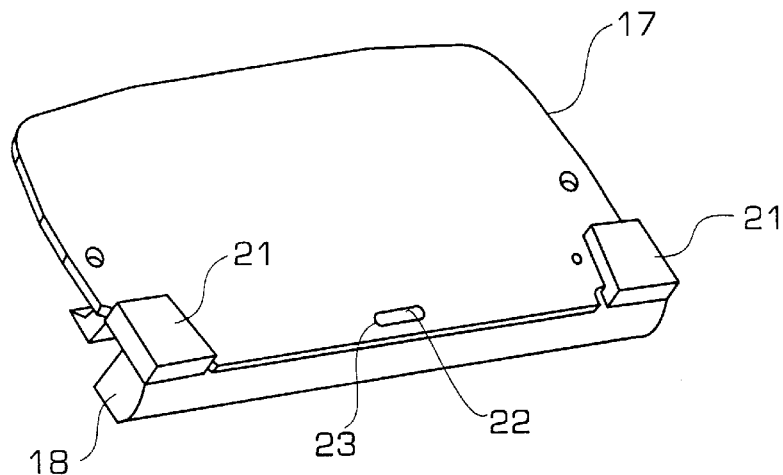
FIG. 3 is a perspective view of a support board incorporated to the apparatus of FIG. 1.
Figure 4:
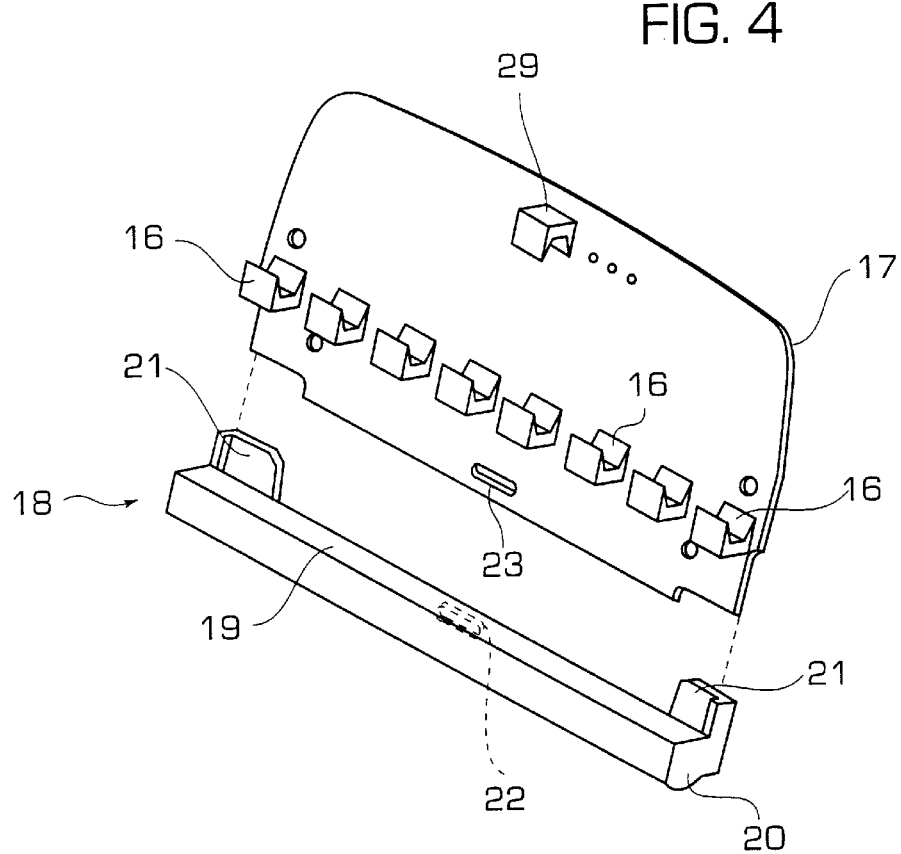
FIG. 4 is a perspective view of the board in FIG. 3, with the focusing lens unseated.

In the drawing views, the numeral 10 designates generally a portable apparatus for reading optical codes, such as bar codes, or the like.

The apparatus 10 comprises an outer case 11 of angled shape having a main portion 12 which also serves as a handgrip, and a forward portion 13 extending at an angle to the main portion 12. The main portion 12 of the case 11 carries all the means required to connect it to both the power supply and a data processing unit; all these components are omitted from the drawings because therefore conventional. The forward portion 13 of the case 11 is formed with a reading window 14, located at the end of the forward portion 13, which window is protected by a plate 15 of a transparent material, such as a glass pane.

The apparatus 10 also comprises, located inside the outer case 11, an illumination means for illuminating an optical code (not shown) placed in front of the reading window 14, as well as a detection means adapted to detect the light scattered back from the illuminated optical code and entering the case 11 through the reading window 14.

The illumination means comprises a set of LEDs 16 mounted on a support board 17 which carries a printed supply/control circuit (not shown in detail) for the LEDs 16. The support board 17 is made of glass-reinforced plastics coated with a light-opaque material, and is located in the forward portion 13 of the case 11 with its plane oriented to face the reading window 14. The support board 17 is mounted preferably such that it will be in close contact with the inner sidewalls of the case 11. The apparatus 10 depicted, which is suitable for reading essentially one-dimensional codes of the type of bar codes, is provided with eight aligned LEDs 16 of the so-called 90-degree type; in such LEDs, the light is emitted along a substantially orthogonal direction to the mounting orientation, i.e. along a substantially parallel direction to the support board 17, in this example. With apparatus intended for reading two-dimensional codes, where optical features of the code must be read which are spread across a plane, LEDs arranged in several rows may be useful.

Mounted on the support board 17 is a cylindrical converging lens 18, commonly referred to as the focusing lens, which is adapted to concentrate the light emitted from the LEDs 16 onto the reading window 14, so as to illuminate as efficiently as possible the optical codes placed in front of the reading window 14. The focusing lens 18 is in the form of a rod of a transparent material having a suitable refractive index, such as polycarbonate, with a planar incident-light face 19 and a cylindrically convex emergent-light face 20.

The lens 18 is mounted at one end of the support board 17 facing the reading window 14, substantially flush with the edge of the support board 17; more precisely, the lens 18 stands proud of the support board 17 outline only with the convexity of face 20.

The lens 18 is snap mounted to the support board 17 by virtue of two arms 21 being formed integrally with the lens 18, and a tang 22 being formed on the lens and interfitting with a respective slot 23 provided in the support board 17. Upon assembly, the lens 18 is slid across the support board 17, with the arms 21 and the lens 18 on opposite sides of the support board 17; the interfitting tang 22 and slot 23 will prevent them from sliding off each other.

The detection means of the apparatus 10 comprises a light-sensitive element, specifically a CCD, schematically shown at 24, which converts the collected light to electric signals. The light collected through the reading window 14 is directed to the CCD 24 along an optical detection path which extends, with an initial section 25 thereof, through the forward portion 13, and with a final section 26, through the main portion 12 of the case 11; the final section 26 is deflected from the initial section 25, at an obtuse angle preferably within the range of 110° to 160° (the angle is of about 125° in the example shown), by a plane mirror 27 housed within the case 11 at a location near the support board 17. It should be noted that this angle would actually vary somewhat according to the inclination of the individual light ray considered; the above specifications should be understood, therefore, for a central light ray L impinging on a central point of the mirror 27 surface.

The final section 26 of the optical detection path further includes a lens (or lens system) 28 for focusing the light rays onto the CCD 24.

The support board 17 carrying the LEDs 16 will locate, therefore, on the side of the light-sensitive element 24 away from the first section 25 of the optical detection path, and accordingly, outside the obtuse angle formed by the sections 25 and 26 of the optical detection path. The LEDs 16 themselves will locate on the side of the support board 17 facing away from the mirror 27.

The apparatus 10 further comprises an LED indicator 29, mounted on the support board 17, on the same side thereof as the LEDs 16 but oriented in the opposite direction from the latter; in fact, whereas the LEDs 16 are aimed at the reading window 14, the LED indicator 29 is aimed at an indicator opening 30 formed through the case 11 in the vicinity of the middle joining region between the main 12 and forward 13 portions, preferably on the main portion 12 in order to be more clearly in sight of an operator holding the apparatus 10 in his/her hand. The opening 30 is closed by a lens 31, which may be formed from a material endowed with sunlight filtering properties.

In operation, the apparatus 10 is brought near an optical code to be read, such that the code is aligned to the reading window 14. The light emitted by the LEDs 16 and concentrated by the lens 18 will strike the code and illuminate it. The illuminated code then emits (by light scattering) a light image corresponding to the code itself; this image, once picked up through the reading window 14, will travel through the sections 25 and 26 of the optical detection path (while being deflected by the mirror 27), and eventually be focused onto the CCD 24 by the lens 28. Thereupon, the CCD 24 will generate an electric signal representing the imaged optical code. The LED indicator 29 will acknowledge a correctly performed reading to the operator.

Where even a minute part of the light emitted by the LEDs 16 should reach the CCD 24 directly, overlapping a code image being read, the code reading would prove problematical, if not altogether impossible. This is prevented from occurring in this invention by the positions of the LEDs 16 relative to the angled optical path.

It should be noted that, by virtue of the lens 31 provided, environmental light would not be admitted into the case 11 in any significant amount. However, should stray rays reach the CCD 24, they would have luminous characteristics which are quite different from those of the light issuing from the LEDs 16 and being scattered back from the optical code, and in no way harm the reading.

Lastly, notice that the all-important feature of avoiding difficulties with the reading is achieved here, not by any complicated arrangements, but rather through a uniquely simple construction which can he implemented in an easy and economical fashion.

What is claimed is:

1. An apparatus (10) for reading an optical code, which apparatus comprises an outer case (11), a reading window (14) open into the case (11), an illumination means (16–20) housed within the case (11) and arranged to act on the optical code being read through the window (14), and a detection means (24–28) housed within the case (11) and responsive to light scattered back from the illuminated optical code into the case (11) through the window (14), wherein the detection means comprises an array of light-sensitive elements (24) capable of converting light to electric signals representing the light image, and an optical detection path (25–28) from the reading window (14) to the light-sensitive elements (24) having a reflective element (27) therein which effectively splits the optical path into two consecutive path sections (25,26) at an angle from each other, and wherein the second path section (26) is deflected from the first path section (25), wherein substantially all light emitted by the illumination means never intersects said first path section since said light is disposed outside the deflection angle between the first and second detection path sections and said illumination means is located adjacent a side of the reflective element opposite from the detection means.

2. An apparatus according to claim 1, wherein the illumination means comprises an array of LEDs (16) mounted on a support board (17), being in turn mounted inside the case (11) and carrying a printed power supply/control circuit for the LEDs (16).

3. An apparatus according to claim 2, wherein the LEDs (16) are mounted on the support board side (17) facing away from the reflective element (27) in the optical detection path (25–26).

4. An apparatus according to claim 3, wherein the support board (17) is opaque to light.

5. An apparatus according to claim 4, wherein the support board (17) is made of glass reinforced plastics and coated with a light-opaque substance.

6. An apparatus according to claim 2, wherein the LEDs (16) emit light along, a substantially parallel direction to the plane containing the support board (17).

7. An apparatus according to claim 2, wherein the illumination means includes a focusing lens (18) mounted on the same side of the support board (17) as the LEDs (16), in front of the LEDs (16).

8. An apparatus according to claim 7, wherein the focusing lens (18) mount is snap fitted to the support board (17), the snap action being assisted by arms (21) formed integrally with the lens (18) and by a tang (22) interlocking with a respective slot (23) formed in the support board (17).

9. An apparatus according to claim 7, wherein the focusing lens (18) is mounted in an end region of the support board (17), facing the reading window (14), and may only protrude from the support board (17) by a convex lens portion (20).

10. An apparatus according to claim 2, including an LED indicator (29) mounted on an opposite side of the support board (17) from the reflective element (27) in the optical detection path (25–26), and aimed at an indicator window (30) open into the case (11).

11. An apparatus according to claim 2, wherein the support board (17) is mounted in close contact with the inner sidewalls of the case (11).

* * * * *